(12) United States Patent
Umeyama et al.

(10) Patent No.: US 9,972,824 B2
(45) Date of Patent: May 15, 2018

(54) SECONDARY BATTERY AND BATTERY PACK

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Hiroaki Imanishi, Moriguchi (JP); Yukinobu Miyamura, Osaka (JP); Koichi Toriyama, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/451,767

(22) Filed: Mar. 7, 2017

(65) Prior Publication Data
US 2017/0263915 A1 Sep. 14, 2017

(30) Foreign Application Priority Data

Mar. 10, 2016 (JP) .................................. 2016-047238

(51) Int. Cl.
*H01M 2/34* (2006.01)

(52) U.S. Cl.
CPC ............. *H01M 2/348* (2013.01); *H01M 2/34* (2013.01); *H01M 2200/10* (2013.01)

(58) Field of Classification Search
CPC ................................. H01M 2/34; H01M 2/348
See application file for complete search history.

(56) References Cited

FOREIGN PATENT DOCUMENTS

JP           2014-082073 A        5/2014

*Primary Examiner* — Ladan Mohaddes
(74) *Attorney, Agent, or Firm* — Sughrue Mion, PLLC (57) ABSTRACT

An inversion plate short-circuits the positive electrode external terminal and the negative electrode external terminal to each other by changing its position. A temperature sensitive member is disposed adjacent to the inversion plate on the side opposite to a direction in which the inversion plate changes its position. The volume of temperature sensitive member increases due to a rise in temperature. The temperature sensitive member contains aluminum phosphite and calcium carbonate.

7 Claims, 8 Drawing Sheets

|  | ALUMINUM PHOSPHITE (wt%) | CALCIUM CARBONATE (wt%) |
|---|---|---|
| EXAMPLE 1 | 90 | 10 |
| EXAMPLE 2 | 95 | 5 |
| EXAMPLE 3 | 50 | 50 |
| COMPARATIVE EXAMPLE 1 | 0 | 100 |
| COMPARATIVE EXAMPLE 2 | 100 | 0 |
| COMPARATIVE EXAMPLE 3 | 97 | 3 |
| COMPARATIVE EXAMPLE 4 | 40 | 60 |
| COMPARATIVE EXAMPLE 5 | NO MEMBER | |

FIG. 10

|  | NUMBER OF SHORT CIRCUITS AFTER HEATING TEST | NUMBER OF SHORT CIRCUITS AFTER IMPACT TEST |
|---|---|---|
| EXAMPLE 1 | 10 | 10 |
| EXAMPLE 2 | 10 | 10 |
| EXAMPLE 3 | 10 | 10 |
| COMPARATIVE EXAMPLE 1 | 10 | 2 |
| COMPARATIVE EXAMPLE 2 | 10 | 3 |
| COMPARATIVE EXAMPLE 3 | 10 | 8 |
| COMPARATIVE EXAMPLE 4 | 10 | 6 |
| COMPARATIVE EXAMPLE 5 | 10 | 3 |

SECONDARY BATTERY AND BATTERY PACK

INCORPORATION BY REFERENCE

The disclosure of Japanese Patent Application No. 2016-047238 filed on Mar. 10, 2016 including the specification, drawings and abstract is incorporated herein by reference in its entirety.

BACKGROUND

1. Technical Field

The disclosure relates to a secondary battery and to a battery pack in which a plurality of secondary batteries are connected to each other.

2. Description of Related Art

Japanese Patent Application Publication No. 2014-082073 (JP 2014-082073 A) discloses a configuration in which a conductive film is disposed in a short circuit mechanism that short-circuits a positive electrode terminal and a negative electrode terminal of a secondary battery to each other and, when the pressure inside a container that houses therein a power generating element is increased, the film is deformed to short-circuit both electrodes of the secondary battery to each other.

SUMMARY

In the configuration described in JP 2014-082073 A, a short circuit is formed by the inversion of the thin film that is easily deformed by the pressure. After the short circuit is formed, there is a possibility that the film is accidentally inverted again to a normal state due to an input of external vibration or the like, resulting in that the short circuit is released.

The disclosure provides a secondary battery that can maintain a short circuit between an external terminal of a first electrode and an external terminal of a second electrode.

A first aspect of the disclosure relates to a secondary battery including a battery element; an exterior body that houses the battery element; an external terminal of a first electrode and an external terminal of a second electrode that are provided outside the exterior body; a short circuit forming portion; and a temperature sensitive member. The short circuit forming portion short-circuits the external terminal of the first electrode and the external terminal of the second electrode to each other by changing its position. The temperature sensitive member is electrically insulative and is disposed adjacent to the short circuit forming portion. The temperature sensitive member is disposed on a side opposite to a direction, in which the short circuit forming portion changes its position, with respect to the short circuit forming portion. The volume of the temperature sensitive member increases due to a rise in temperature. The temperature sensitive member contains aluminum phosphite and calcium carbonate.

According to the secondary battery thus configured, the temperature sensitive member detects a temperature rise and is expanded when the temperature reaches a threshold value, so that the short circuit forming portion is held in a state in which its position is changed. Since it is reliably avoided that the short circuit forming portion is accidentally returned to a normal state due to vibration or the like, it is possible to reliably maintain a short circuit between the external terminal of the first electrode and the external terminal of the second electrode.

The short circuit forming portion may be configured to provide part of a conduction path between the battery element and the external terminal of the first electrode and to interrupt continuity between the battery element and the external terminal of the first electrode by changing its position. With this configuration, it is possible to interrupt the flow of current between the battery element and the external terminal of the first electrode when the short circuit forming portion changes its position.

The short circuit forming portion may have a plate shape that is curved in a thickness direction, and may be configured to interrupt the continuity between the battery element and the external terminal of the first electrode by inverting a curved direction of the short circuit forming portion. With this configuration, it is possible to reliably interrupt the flow of current between the battery element and the external terminal of the first electrode by the inversion of the short circuit forming portion.

The short circuit forming portion may be configured to change its position when an internal pressure of the exterior body is increased. With this configuration, it is possible to short-circuit the external terminal of the first electrode and the external terminal of the second electrode to each other when the short circuit forming portion changes its position in response to a rise in the internal pressure of the exterior body.

The temperature sensitive member may have a ring shape. With this configuration, it is possible to reliably maintain the state, in which the position of the short circuit forming portion is changed, by the expanded temperature sensitive member.

The temperature sensitive member may contain 5 wt % or more and 50 wt % or less calcium carbonate. By containing 5 wt % or more calcium carbonate, it is possible to obtain a calorific value that is necessary for reaching an expansion start temperature of aluminum phosphite. By setting the content of calcium carbonate to 50 wt % or less, it is possible to form the temperature sensitive member sufficiently containing aluminum phosphite whose expansion rate is high, and thus to sufficiently expand the temperature sensitive member.

A second aspect of the disclosure relates to a battery pack in which a plurality of secondary batteries each according to the first aspect are connected in series. According to the battery pack thus configured, when the internal pressure of the exterior body of one of the secondary batteries is increased, the external terminal of the first electrode and the external terminal of the second electrode of the secondary battery subjected to the occurrence of an abnormality are reliably short-circuited to each other, so that it is possible to improve the reliability of the entire battery pack.

According to the disclosure, since, after the short circuit forming portion changes its position, the short circuit forming portion can be held in the state where its position is changed, it is possible to reliably maintain a short circuit between the external terminal of the first electrode and the external terminal of the second electrode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, an embodiment will be described with reference to the drawings. When referring to the number, the amount, and so on, the scope of the disclosure is not necessarily limited thereto unless otherwise stated. There are cases where the same or corresponding components are denoted by the same reference numerals, thereby omitting duplicate description thereof. In the drawings, illustration is not made according to the actual dimensional ratio, but, in order to facilitate understanding of a structure, illustration is made by changing the dimensional ratio to clarify the structure.

Figure 1:
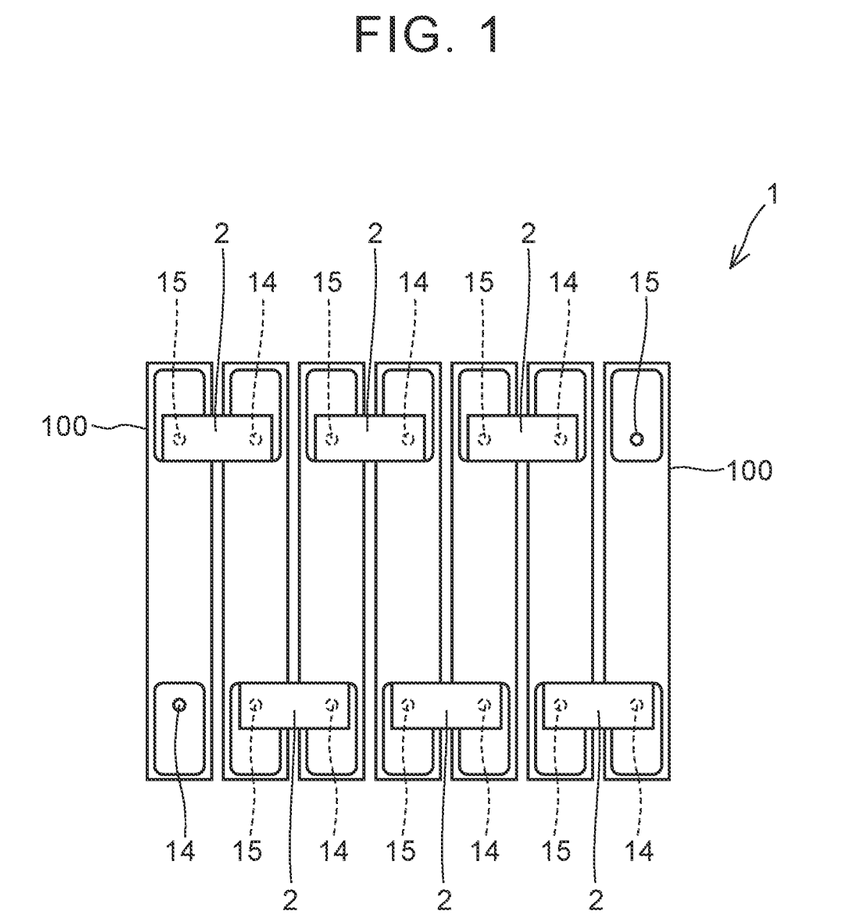
FIG. 1 is a plan view showing a battery pack in an embodiment.

FIG. 1 is a plan view showing a battery pack 1 in this embodiment. The battery pack 1 according to this embodiment is installed in a hybrid vehicle. The battery pack 1 serves as a power source of the hybrid vehicle along with an internal combustion engine such as a gasoline engine or a diesel engine.

As shown in FIG. 1, the battery pack 1 is constituted by connecting a plurality of chargeable/dischargeable secondary batteries 100 in series. In the battery pack 1 shown in FIG. 1, the seven secondary batteries 100 of the same shape are connected in series to constitute the battery pack 1. The number of the secondary batteries 100 that constitute the battery pack 1 is not particularly limited. Restraining members (not shown) that collectively restrain the secondary batteries 100 are provided around the battery pack 1.

The secondary batteries 100 are arranged at regular intervals. The secondary batteries 100 are arranged such that side surfaces with the largest area of the secondary batteries 100 face each other. A cooling plate, a buffer plate, or the like (not shown) is disposed between the adjacent two secondary batteries 100.

The secondary battery 100 includes a negative electrode external terminal 14 and a positive electrode external terminal 15. The secondary batteries 100 are disposed to be alternately inverted such that the negative electrode external terminals 14 and the positive electrode external terminals 15 are alternately disposed. The secondary batteries 100 are disposed such that the negative electrode external terminal 14 of one of the adjacent two secondary batteries 100 and the positive electrode external terminal 15 of the other of the adjacent two secondary batteries 100 are adjacent to each other.

The battery pack 1 includes inter-terminal connecting members 2 respectively connecting the adjacent secondary batteries 100 to each other. The inter-terminal connecting member 2 electrically connects the negative electrode external terminal 14 of one of the adjacent two secondary batteries 100 and the positive electrode external terminal 15 of the other of the adjacent two secondary batteries 100 to each other. In this way, the secondary batteries 100 are connected in series to constitute the battery pack 1 with a desired voltage.

Figure 2:
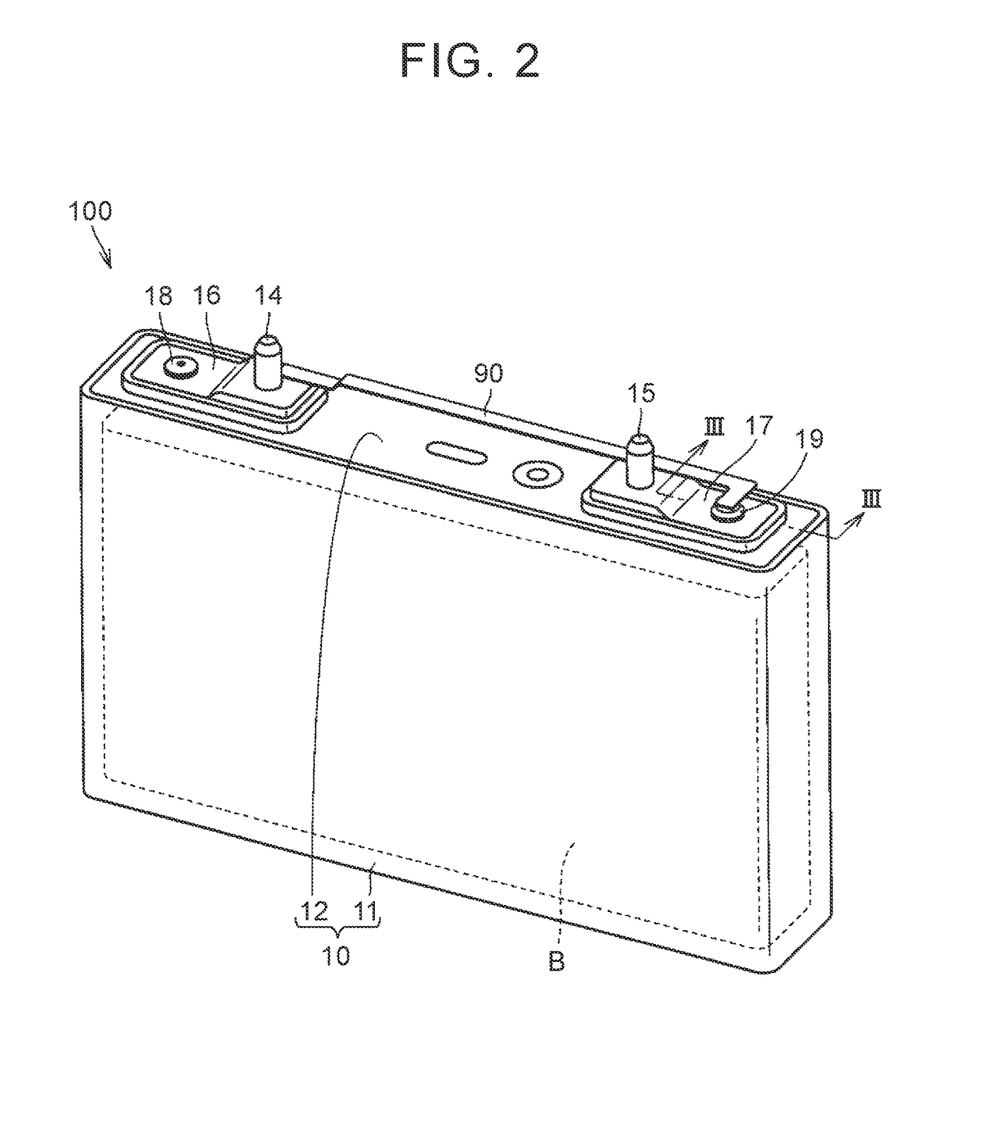
FIG. 2 is a perspective view showing one of secondary batteries that constitute the battery pack shown in FIG. 1.

FIG. 2 is a perspective view showing one of the secondary batteries 100 that constitute the battery pack 1 shown in FIG. 1. The secondary battery 100 includes a battery element B, an exterior body 10, the negative electrode external terminal 14, the positive electrode external terminal 15, and conductive plates 16 and 17. The battery element B is formed by stacking positive and negative electrode plates with a separator interposed therebetween. The exterior body 10 houses therein the battery element (electrode body) B. The exterior body 10 includes a housing portion 11 and a sealing member 12. The housing portion 11 has a generally rectangular parallelepiped shape that is open in one direction, and forms an exterior body of the secondary battery 100. In the housing portion 11, the battery element B is placed along with an electrolyte solution.

The sealing member 12 has a flat plate shape that is generally rectangular in plan view, and is disposed at an opening of the housing portion 11. The sealing member 12 is provided to close the opening of the housing portion 11. The housing portion 11 and the sealing member 12 jointly define a sealed space that receives therein the battery element B. The housing portion 11 and the sealing member 12 are made of a metal material such as aluminum.

The negative electrode external terminal 14 and the positive electrode external terminal 15 are provided outside the exterior body 10 as external terminals of the secondary battery 100. The negative electrode external terminal 14 and the positive electrode external terminal 15 are attached to the sealing member 12.

The secondary battery 100 includes a device (hereinafter referred to as a "current interrupt device") that interrupts the flow of current between the battery element B and the external terminal when the pressure inside the exterior body 10 is increased. The current interrupt device is provided to at least one of the negative electrode external terminal 14 and the positive electrode external terminal 15. In this embodiment, a description is exemplarily given of a case in which the current interrupt device is provided to the positive electrode external terminal 15. In this embodiment, the positive electrode external terminal 15 corresponds to an external terminal of a first electrode, while the negative electrode external terminal 14 corresponds to an external terminal of a second electrode.

The negative electrode external terminal 14 is provided to pass through the conductive plate 16. The conductive plate 16 is electrically connected to the negative electrode external terminal 14. The conductive plate 16 is provided with a rivet member 18. The rivet member 18 is provided to pass through the conductive plate 16 and the sealing member 12 and extends from the inside to the outside of the exterior body 10.

The positive electrode external terminal 15 is provided to pass through the conductive plate 17. The conductive plate 17 is electrically connected to the positive electrode external terminal 15. The conductive plate 17 is provided with a rivet member 19. The rivet member 19 is provided to pass through the conductive plate 17 and the sealing member 12 and extends from the inside to the outside of the exterior body 10.

The secondary battery 100 further includes a bypass member 90. The bypass member 90 is made of a conductive material. One end portion of the bypass member 90 is fixed to the conductive plate 16. The bypass member 90 is electrically connected to the conductive plate 16. The bypass member 90 is electrically connected to the negative electrode external terminal 14 via the conductive plate 16. The other end portion of the bypass member 90 is disposed above the rivet member 19. The bypass member 90 is disposed away from the rivet member 19. The bypass member 90 is provided to be in non-contact with the conductive plate 17.

Figure 3:
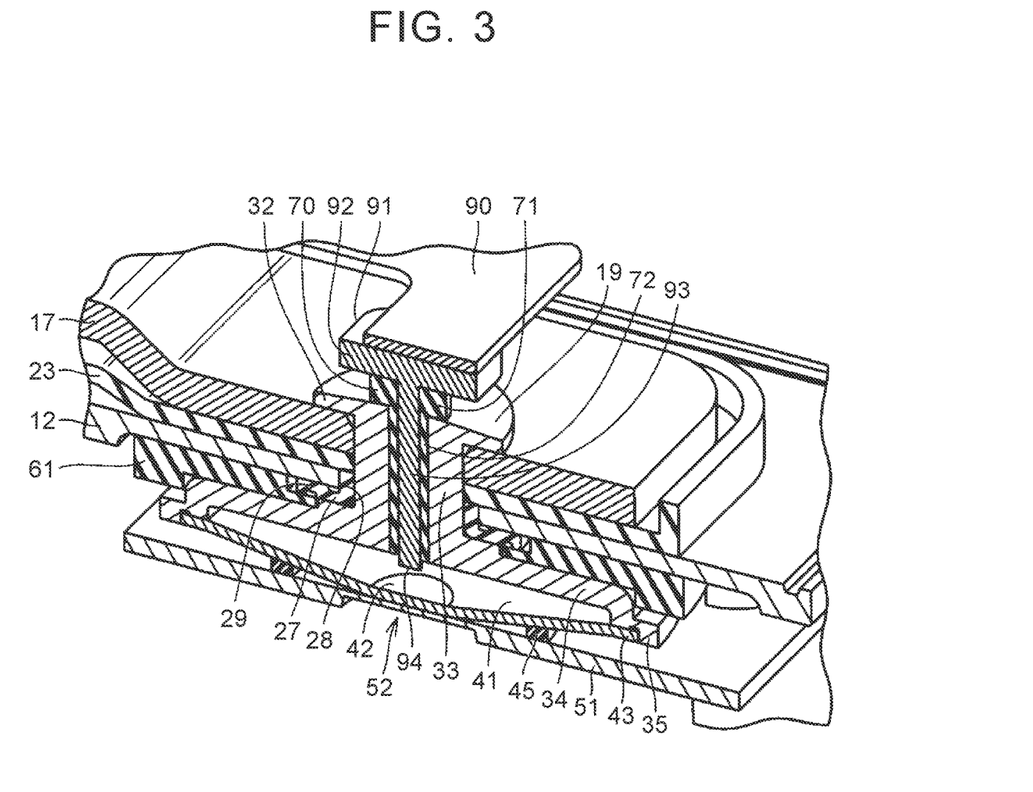
FIG. 3 is a partial sectional view of the secondary battery taken along line III-III in FIG. 2.

FIG. 3 is a sectional view of the secondary battery 100 taken along line III-III in FIG. 2. Referring to FIG. 3, the configuration of the current interrupt device will be described. As shown in FIG. 3, an insulator 23, a gasket 27, an inversion plate 41, a current collector member 51, and a holder member 61 are provided near the sealing member 12 and the rivet member 19.

The insulator 23 is provided outside the exterior body 10. The insulator 23 is placed on the sealing member 12. The insulator 23 is interposed between the sealing member 12 and the conductive plate 17. Further, the insulator 23 is interposed between the sealing member 12 and the positive electrode external terminal 15. The insulator 23 is made of an insulating material and provides electrical insulation between the sealing member 12 and the positive electrode external terminal 15/the conductive plate 17.

The rivet member 19 is made of a conductive material. The rivet member 19 is made of a metal material such as copper or aluminum. The rivet member 19 passes through a through-hole formed in the sealing member 12. The rivet member 19 is connected to the conductive plate 17 outside the exterior body 10 and connected to the inversion plate 41 inside the exterior body 10. The rivet member 19 establishes electrical connection between the conductive plate 17 and the inversion plate 41.

The rivet member 19 has as its constituent portions an outer flange portion 32, a shaft portion 33, an inner flange portion 34, and a peripheral portion 35.

The shaft portion 33 has a hollow cylindrical shape. The shaft portion 33 passes through the through-hole of the sealing member 12 and thus extends through the sealing member 12. The shaft portion 33 further extends through the insulator 23 and the conductive plate 17 outside the exterior body 10.

The outer flange portion 32 is provided at an end portion of the shaft portion 33 extending tubularly toward the outside of the exterior body 10. The outer flange portion 32 is connected to the end portion of the shaft portion 33 outside the exterior body 10. The outer flange portion 32 has a flange shape extending radially outward from the hollow cylindrical shaft portion 33. The outer flange portion 32 is in contact with the conductive plate 17. The outer flange portion 32 is electrically connected to the conductive plate 17. The insulator 23 and the conductive plate 17 are held between the outer flange portion 32 and the sealing member 12.

The inner flange portion 34 is provided at an end portion of the shaft portion 33 extending tubularly toward the inside of the exterior body 10. The inner flange portion 34 is connected to the end portion of the shaft portion 33 inside the exterior body 10. The inner flange portion 34 has a flat plate shape. The inner flange portion 34 has a disk shape centering on a center line of the shaft portion 33. The inner flange portion 34 faces the sealing member 12 with a distance therebetween in one of directions in which the shaft portion 33 extends (upward direction in FIG. 3), while the inner flange portion 34 faces the current collector member 51 with a distance therebetween in the other of the directions in which the shaft portion 33 extends (downward direction in FIG. 3).

The peripheral portion 35 is provided at an outer peripheral edge of the inner flange portion 34. The peripheral portion 35 is provided to be bent in a direction toward the current collector member 51 from the outer peripheral edge of the inner flange portion 34. A later-described second connecting portion 43 of the inversion plate 41 is connected to the peripheral portion 35 by welding.

The gasket 27 is made of an elastic resin material or a rubber material, such as PFA (perfluoroalkoxy fluorine resin) or EPDM (ethylene-propylene-diene rubber). The gasket 27 is provided in contact with the rivet member 19. The gasket 27 is interposed between the sealing member 12 and the rivet member 19. The gasket 27 is provided as a seal member between the sealing member 12 and the rivet member 19 and between the sealing member 12 and the holder member 61. The gasket 27 is disposed in a gap between the sealing member 12 and the rivet member 19 and disposed in a gap between the sealing member 12 and the holder member 61, so that the inside of the exterior body 10 is hermetically sealed.

The gasket 27 has as its constituent portions a barrel portion 28 and a flange portion 29. The barrel portion 28 has a hollow cylindrical shape. The barrel portion 28 passes through the through-hole of the sealing member 12. The barrel portion 28 is provided such that its outer peripheral surface is in contact with an inner peripheral surface of the through-hole of the sealing member 12, while its inner peripheral surface is in contact with an outer peripheral surface of the shaft portion 33 of the rivet member 19.

The flange portion 29 has a flange shape extending radially outward from an end portion of the hollow cylindrical barrel portion 28. The flange portion 29 is held between the sealing member 12 and the rivet member 19 and between the sealing member 12 and the holder member 61 in the direction in which the shaft portion 33 of the rivet member 19 extends. The flange portion 29 is fixed in a state in which the flange portion 29 is compressed and deformed between the sealing member 12 and the rivet member 19 and between the sealing member 12 and the holder member 61 in the direction in which the shaft portion 33 extends.

The inversion plate 41 has a thin plate shape that is circular in plan view. The inversion plate 41 has a warped shape so as to be concave on the side facing the inner flange portion 34 and convex on the side facing the current collector member 51. The inversion plate 41 has a plate shape that is curved in a thickness direction. The inversion plate 41 has a dish shape.

The inversion plate 41 is made of a conductive material. The inversion plate 41 is disposed between the inner flange portion 34 of the rivet member 19 and the current collector member 51. The inversion plate 41 is fixed to the rivet member 19 and to the current collector member 51 by welding. The inversion plate 41 establishes electrical connection between the rivet member 19 and the current collector member 51.

The inversion plate 41 has as its constituent portions a first connecting portion 42 and the second connecting portion 43. The first connecting portion 42 is provided at the center of the inversion plate 41 that is circular in plan view. The second connecting portion 43 is provided at a peripheral edge of the inversion plate 41 that is circular in plan view. The first connecting portion 42 is provided at a forward end of the inversion plate 41 that is convex on the side facing the current collector member 51. The second connecting portion 43 extends annularly along the peripheral edge of the inversion plate 41.

The first connecting portion 42 is connected to the current collector member 51. The first connecting portion 42 is fixed to a thin portion 52 of the current collector member 51 by welding. The second connecting portion 43 is connected to the rivet member 19. The second connecting portion 43 is fixed to the peripheral portion 35 of the rivet member 19 by welding.

The inversion plate 41 shown in FIG. 3 has a portion extending in a direction, that is inclined with respect to a direction in which the sealing member 12 of the flat plate shape extends, and that is inclined with respect to the direction in which the hollow cylindrical shaft portion 33 extends, so as to get away from the sealing member 12 and to approach the current collector member 51 as going toward the first connecting portion 42 from the second connecting portion 43.

The holder member 61 is made of an insulating resin with high rigidity such as PPS (polyphenylene sulfide). The holder member 61 is provided in the exterior body 10. The holder member 61 is provided as a member for holding the current collector member 51 inside the exterior body 10. The holder member 61 has a shape surrounding the rivet member 19 and the inversion plate 41. The holder member 61 is fixed in a state in which the holder member 61 is held between the sealing member 12 and the inner flange portion 34 of the rivet member 19.

The current collector member 51 forms a contact between the battery element B and the current interrupt device inside the exterior body 10. The current collector member 51 is held by the holder member 61 inside the exterior body 10. The current collector member 51 faces the inner flange portion 34 of the rivet member 19 with a distance therebetween.

The current collector member 51 has the thin portion 52. The thin portion 52 is made thinner than the other portion by means of a groove formed in the current collector member 51. The current collector member 51 is connected to the inversion plate 41 at the thin portion 52. A later-described current collector terminal 53 is provided to the current collector member 51 in a direction away from the sealing member 12. The current collector terminal 53 extends from the current collector member 51 and is connected to an electrode plate of the battery element B shown in FIG. 1. The current collector member 51 is electrically connected to the battery element B via the current collector terminal 53.

An assembly process (caulking process) of the current interrupt device will be described. On the inner flange portion 34 of the rivet member 19 shown in FIG. 3, the holder member 61, the gasket 27, the sealing member 12, the insulator 23, and the conductive plate 17 are stacked in this order. In this state, the shaft portion 33 passes through a stacked body of the holder member 61, the gasket 27, the sealing member 12, the insulator 23, and the conductive plate 17 that are stacked on the inner flange portion 34.

The outer flange portion 32 of the rivet member 19 is disposed as shown in FIG. 3 by caulking, but, before the caulking, a member corresponding to the outer flange portion 32 has a hollow cylindrical shape having the same diameter as the shaft portion 33 and is disposed concentrically with the shaft portion 33. Therefore, before the assembly of the current interrupt device, the outer flange portion 32 and the shaft portion 33 are provided as an integral hollow cylindrical member.

To the stacked body of the holder member 61, the gasket 27, the sealing member 12, the insulator 23, and the conductive plate 17, a load is applied in a stacking direction of the stacked body from the conductive plate 17 side. By applying a compressive force to the gasket 27 in the direction in which the shaft portion 33 of the rivet member 19 extends, a state is obtained in which an upper surface of the flange portion 29 comes in contact with the sealing member 12, while a lower surface of the flange portion 29 comes in contact with the rivet member 19 and the holder member 61. In this state, an end portion of the above-described integral hollow cylindrical member is expanded radially outward using a dedicated punch so as to form the outer flange portion 32, so that the above-described stacked body is held between the inner flange portion 34 and the outer flange portion 32 of the rivet member 19 and fixed integrally by caulking. In this way, all the components are fixed together and assembled into the current interrupt device.

A conductive member 91 and an insulating member 70 are disposed to pass through the shaft portion 33 of the rivet member 19 formed hollow. The conductive member 91 is made of a conductive material. The insulating member 70 is made of an insulating material.

The conductive member 91 has as its constituent portions a head portion 92 and a trunk portion 93. The trunk portion 93 passes through a through-hole formed in the shaft portion 33 of the rivet member 19. The trunk portion 93 passes through the shaft portion 33 of the rivet member 19 and extends from the inside to the outside of the exterior body 10. The head portion 92 is attached to one of end portions of the trunk portion 93. The other end portion of the trunk portion 93 is provided with a distal end 94.

The head portion 92 is fixed to the end portion, located outside the exterior body 10 in FIG. 3, of the trunk portion 93. The end portion, located inside the exterior body 10 in FIG. 3, of the trunk portion 93 forms the distal end 94. The distal end 94 protrudes from the through-hole formed in the shaft portion 33 of the rivet member 19. The distal end 94 faces the first connecting portion 42 of the inversion plate 41. The distal end 94 shown in FIG. 3 is disposed away from the first connecting portion 42 of the inversion plate 41.

The insulating member 70 has as its constituent portions a head portion 71 and a trunk portion 72. The trunk portion 72 has a hollow cylindrical shape. The trunk portion 72 passes through the through-hole formed in the shaft portion 33 of the rivet member 19. The trunk portion 72 extends from the inside to the outside of the exterior body 10. The head portion 71 is attached to one of end portions of the trunk portion 72. The head portion 71 is fixed to the end portion, located outside the exterior body 10 in FIG. 3, of the trunk portion 72.

The head portion 71 of the insulating member 70 is interposed between the head portion 92 of the conductive member 91 and the outer flange portion 32 of the rivet member 19. The head portion 92 of the conductive member 91 is disposed to be spaced apart from the outer flange portion 32 of the rivet member 19. The trunk portion 72 of the insulating member 70 is interposed between the trunk portion 93 of the conductive member 91 and the shaft portion 33 of the rivet member 19. An inner peripheral surface of the trunk portion 72 is in contact with an outer peripheral surface of the trunk portion 93, while an outer peripheral surface of the trunk portion 72 is in contact with an inner peripheral surface of the through-hole of the shaft portion 33. The trunk portion 93 of the conductive member 91 is disposed to be spaced apart from the shaft portion 33 of the rivet member 19.

The insulating member 70 is provided between the conductive member 91 and the rivet member 19 such that the conductive member 91 is not in contact with the rivet member 19. The conductive member 91 is not electrically connected to the rivet member 19. The conductive member 91 is electrically insulated from the rivet member 19. The bypass member 90 shown in FIG. 3 is not electrically connected to either of the conductive plate 17 and the positive electrode external terminal 15.

The head portion 92 of the conductive member 91 is in contact with the bypass member 90. The conductive member 91 is electrically connected to the bypass member 90. The conductive member 91 is electrically connected to the negative electrode external terminal 14 via the bypass member 90.

A temperature sensitive member 45 is interposed between the inversion plate 41 and the current collector member 51. The temperature sensitive member 45 is disposed adjacent to the inversion plate 41. The temperature sensitive member 45 is disposed to be sandwiched between the inversion plate 41 and the current collector member 51. The temperature sensitive member 45 is disposed on the side closer to the current collector member 51 (lower side in FIG. 3) with respect to the inversion plate 41. As will be described later, the inversion plate 41 changes its position in a direction away from the current collector member 51, while the temperature sensitive member 45 is disposed on the side opposite to the direction, in which the inversion plate 41 changes its position, with respect to the inversion plate 41.

The temperature sensitive member 45 is in contact with a surface, facing the current collector member 51, of the inversion plate 41. The first connecting portion 42 is provided at the center of the inversion plate 41 that is circular in plan view, while the second connecting portion 43 is provided at the peripheral edge of the inversion plate 41. The temperature sensitive member 45 is in contact with a portion between the first connecting portion 42 and the second connecting portion 43 in a radial direction of the disk-shaped inversion plate 41.

The temperature sensitive member 45 is in contact with a surface, facing the inversion plate 41, of the current collector member 51. The temperature sensitive member 45 is in contact with a portion around the thin portion 52 of the current collector member 51. The temperature sensitive member 45 is in contact with a portion between a position, in which the current collector terminal 53 is provided to the current collector member 51, and the thin portion 52.

The temperature sensitive member 45 is made of an insulating material and thus is electrically insulative. The temperature sensitive member 45 is in contact with both of the inversion plate 41 and the current collector member 51, but does not electrically connect the inversion plate 41 and the current collector member 51 to each other. The inversion plate 41 and the current collector member 51 shown in FIG. 3 are in an electrically connected state by contact between the first connecting portion 42 of the inversion plate 41 and the thin portion 52 of the current collector member 51.

Figure 4:
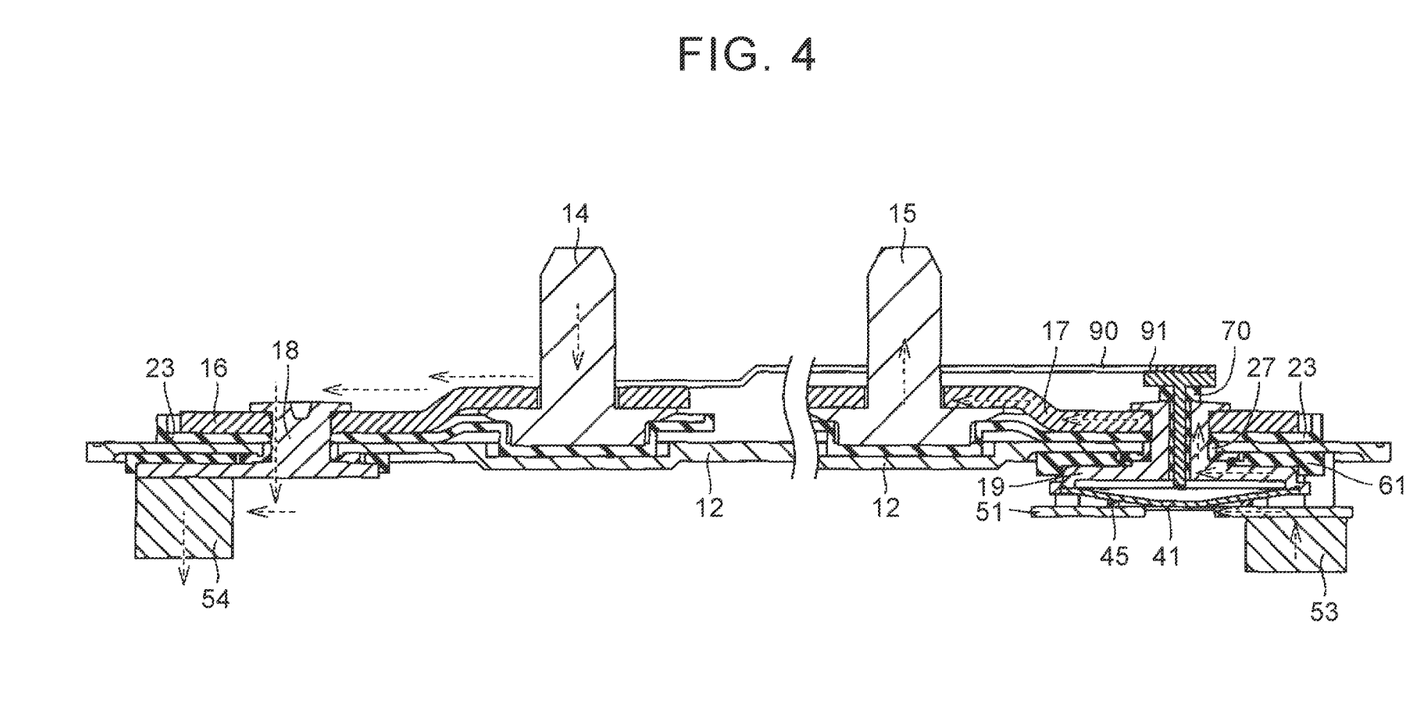
FIG. 4 is an exemplary sectional view showing the flow of current in the secondary battery in a normal state.

FIG. 4 is an exemplary sectional view showing the flow of current in the secondary battery 100 in a normal state. In FIG. 4, a section of the secondary battery 100 including the negative electrode external terminal 14 and the rivet member 18 shown in FIG. 2 and a section of the secondary battery 100 including the positive electrode external terminal 15 and the above-described current interrupt device are shown in an enlarged scale.

As shown in FIG. 4, the negative electrode external terminal 14 and the conductive plate 16 are disposed outside the exterior body 10. The insulator 23 is interposed between the negative electrode external terminal 14/the conductive plate 16 and the sealing member 12. Consequently, the exterior body 10 is electrically insulated from the negative electrode external terminal 14 and the conductive plate 16.

The positive electrode external terminal 15 and the conductive plate 17 are disposed outside the exterior body 10. The insulator 23 is interposed between the positive electrode external terminal 15/the conductive plate 17 and the sealing member 12. Consequently, the exterior body 10 is electrically insulated from the positive electrode external terminal 15 and the conductive plate 17.

The rivet member 18 is made of a conductive material. The rivet member 18 is made of a metal material such as copper or aluminum. The rivet member 18 passes through a through-hole formed in the sealing member 12. The rivet member 18 is connected to the conductive plate 16 outside the exterior body 10 and connected to a current collector terminal 54 inside the exterior body 10. The rivet member 18 establishes electrical connection between the conductive plate 16 and the current collector terminal 54.

Broken-line arrows shown in FIG. 4 indicate the flow of current. In a normal state before the current interrupt device starts to operate, the current flows from the negative electrode external terminal 14, through the conductive plate 16, the rivet member 18, and the current collector terminal 54, to the battery element B in this order. Further, the current flows from the battery element B, through the current collector terminal 53, the current collector member 51, the inversion plate 41, the rivet member 19, and the conductive plate 17, to the positive electrode external terminal 15 in this order. Consequently, the electric power is supplied from the secondary battery 100 to the outside. When charging the secondary battery 100, the current flows in a direction opposite to the above.

Figure 5:
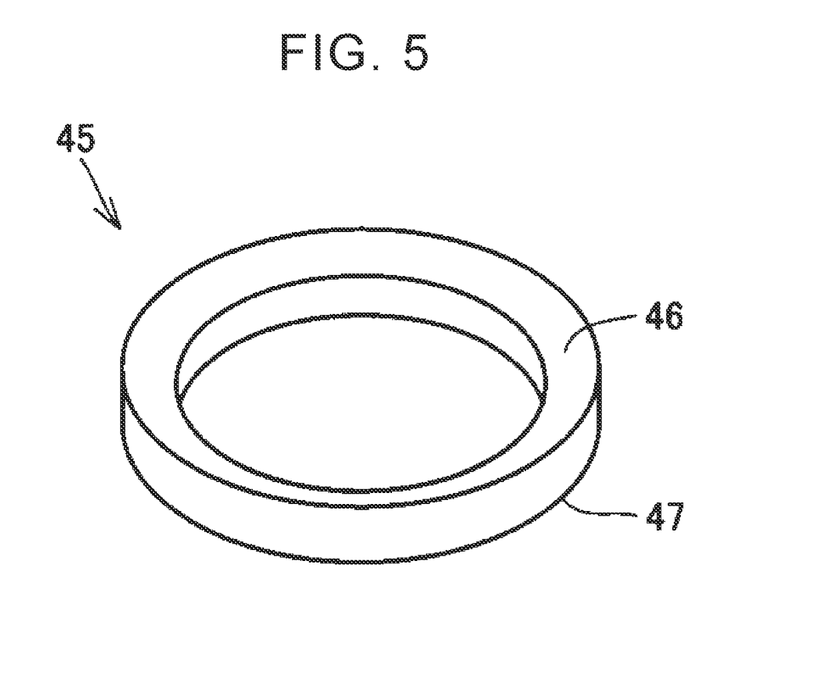
FIG. 5 is a perspective view showing a configuration of a temperature sensitive member.

FIG. 5 is a perspective view showing a configuration of the temperature sensitive member 45. In FIG. 5, there is shown a perspective view of the temperature sensitive member 45 in a state in which the temperature sensitive member 45 is sandwiched between the inversion plate 41 and the current collector member 51, whose section is shown in FIGS. 3 and 4. As shown in FIG. 5, the temperature sensitive member 45 has a ring shape. The temperature sensitive member 45 shown in FIGS. 3 and 4 is disposed concentrically with the disk-shaped inversion plate 41.

The temperature sensitive member 45 has an upper surface 46 and a lower surface 47. In the state where the temperature sensitive member 45 is disposed to be sandwiched between the inversion plate 41 and the current collector member 51 as shown in FIGS. 3 and 4, the upper surface 46 is in surface contact with the inversion plate 41, while the lower surface 47 is in surface contact with the current collector member 51. The upper surface 46 is in contact with a portion, between the first connecting portion 42 and the second connecting portion 43, of the inversion plate 41. Therefore, the upper surface 46 shown in FIG. 5 is inclined to conform to the shape of the inversion plate 41 such that the distance between the outer peripheral edge of the upper surface 46 and the lower surface 47 is farthest on the upper surface 46 and the distance between the inner peripheral edge of the upper surface 46 and the lower surface 47 is closet on the upper surface 46. The temperature sensitive member 45 shown in FIG. 5 has a maximum thickness at its outer peripheral edge and a minimum thickness at its inner peripheral edge.

The temperature sensitive member 45 is made of a mixture of aluminum phosphite and calcium carbonate. The temperature sensitive member 45 may possibly contain unavoidable impurities that are unavoidably mixed in at the time of the manufacture. Preferably, the temperature sensitive member 45 contains 5 wt % or more and 50 wt % or less calcium carbonate.

Figure 6:
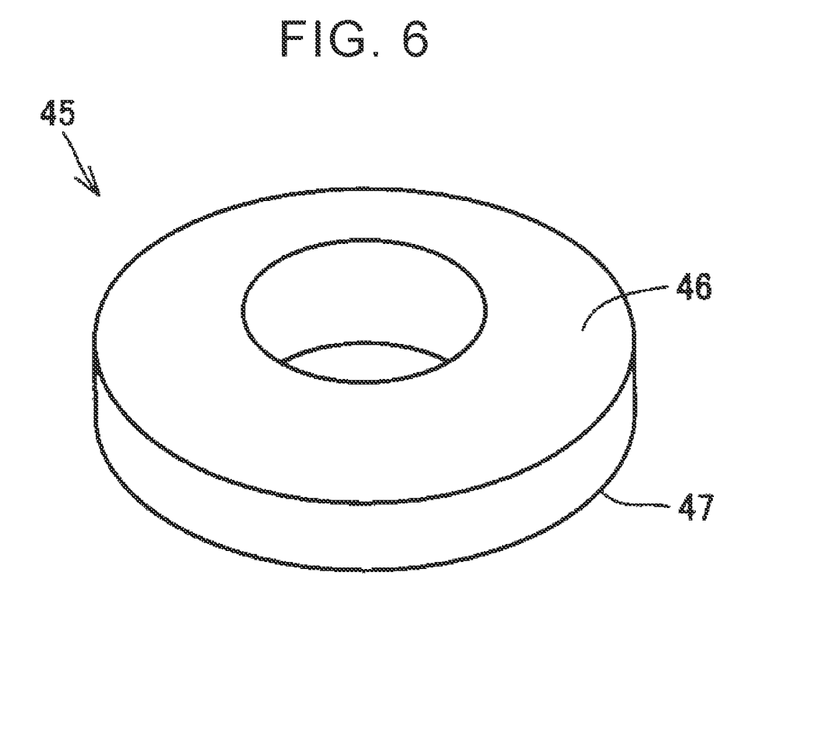
FIG. 6 is a perspective view showing the temperature sensitive member after expansion.

FIG. 6 is a perspective view showing the temperature sensitive member 45 after expansion. In FIG. 6, there is shown a perspective view of the temperature sensitive member 45 in a state in which the temperature sensitive member 45 is sandwiched between the inversion plate 41 after inversion and the current collector member 51, whose section is shown in later-described FIGS. 7 and 8.

The temperature sensitive member 45 is expanded when the ambient temperature exceeds a predetermined threshold value. The volume of the temperature sensitive member 45 increases due to a rise in temperature. Comparing FIGS. 5 and 6, the temperature sensitive member 45 after the expansion shown in FIG. 6 is increased in thickness, reduced in inner diameter, and increased in outer diameter compared to the temperature sensitive member 45 before the expansion shown in FIG. 5. Once expanded, the temperature sensitive member 45 is configured to maintain the expanded state even if the temperature decreases thereafter.

The upper surface 46 shown in FIG. 6 is in contact with a portion, between the first connecting portion 42 and the second connecting portion 43, of the inversion plate 41 after the inversion. Therefore, the upper surface 46 shown in FIG. 6 is inclined to conform to the shape of the inversion plate 41 such that the upper surface 46 most approaches the lower surface 47 at its outer peripheral edge and is most away from the lower surface 47 at its inner peripheral edge. The temperature sensitive member 45 shown in FIG. 6 has a minimum thickness at its outer peripheral edge and a maximum thickness at its inner peripheral edge. The minimum thickness of the temperature sensitive member 45 is greater than a distance between the second connecting portion 43 of the inversion plate 41 and the current collector member 51.

Figure 7:
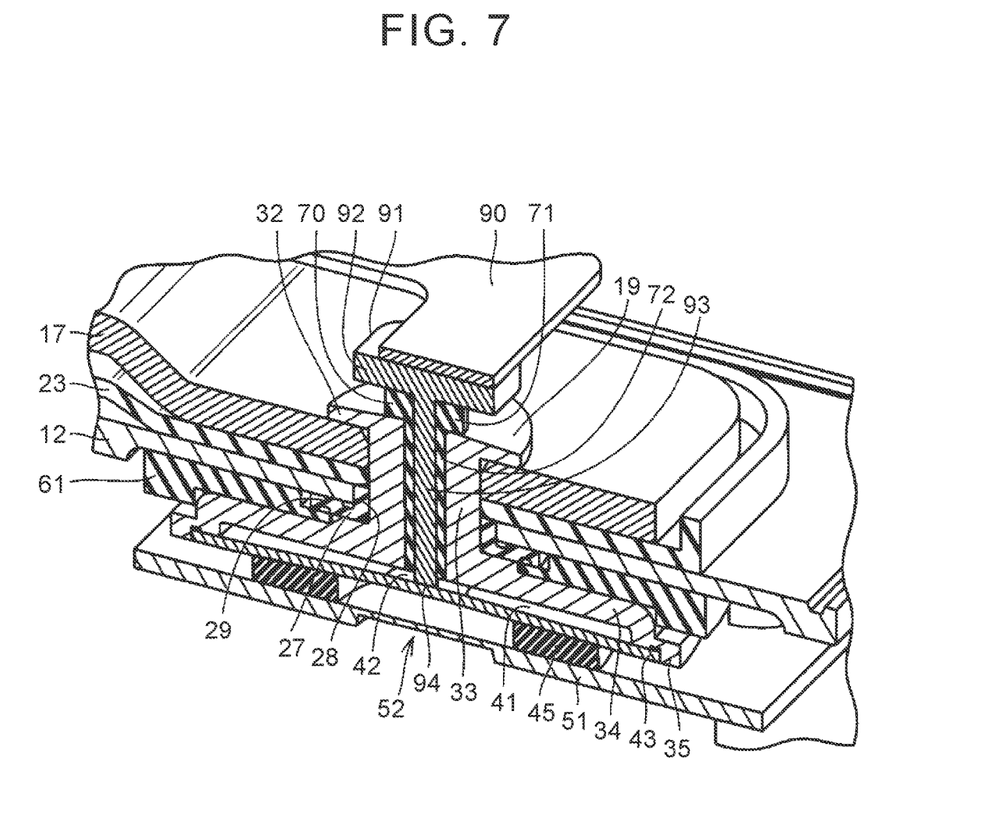
FIG. 7 is a partial sectional view of the secondary battery in a state after an inversion plate is inverted.
Figure 8:
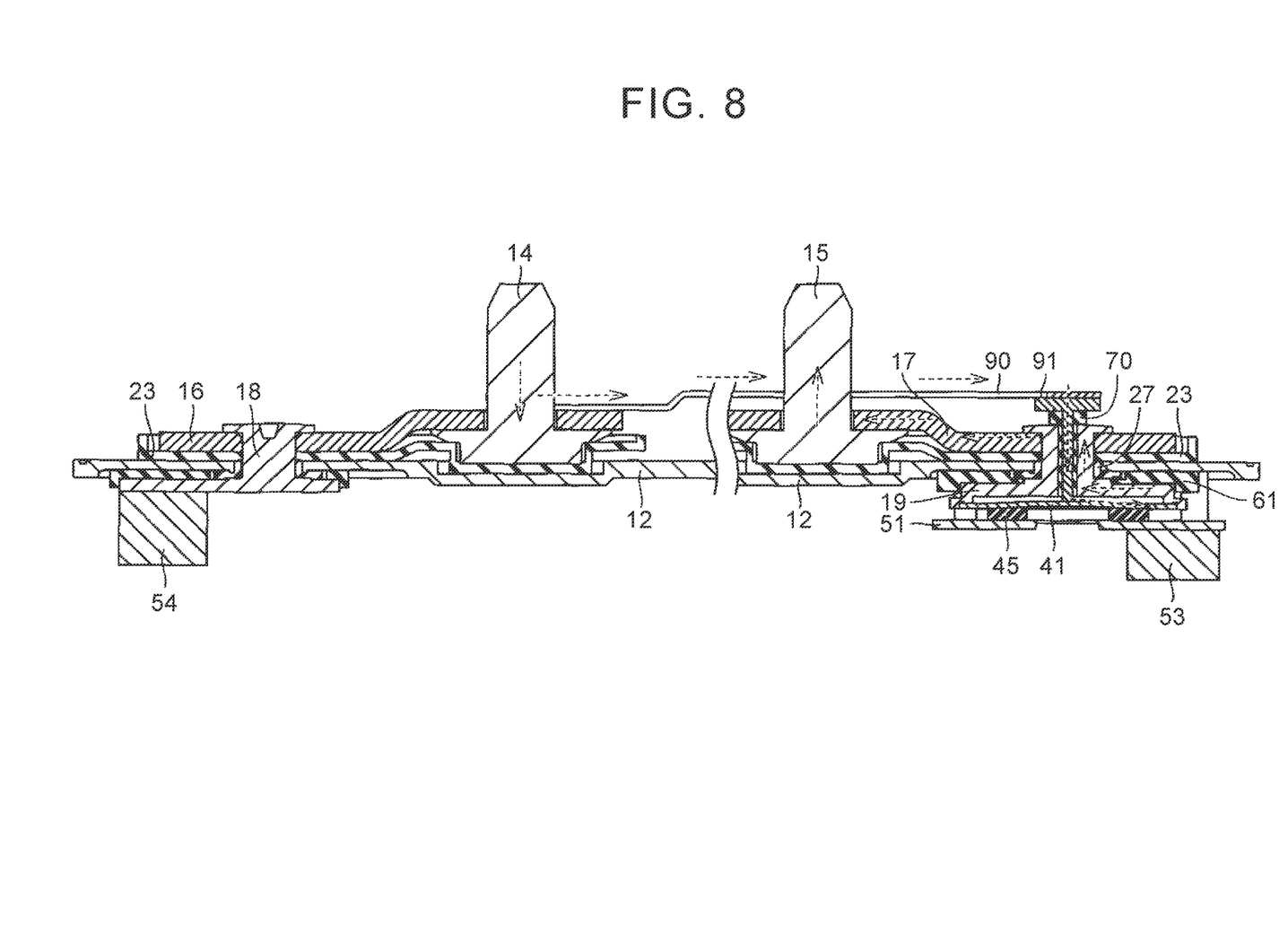
FIG. 8 is an exemplary sectional view showing the flow of current in the secondary battery in the state after the inversion plate is inverted.

FIG. 7 is a partial sectional view of the secondary battery 100 in the state after the inversion plate 41 is inverted. FIG. 8 is an exemplary sectional view showing the flow of current in the secondary battery 100 in the state after the inversion plate 41 is inverted. When the pressure inside the exterior body 10 is rapidly increased, the thin portion 52 of the current collector member 51 is pressed by a gas in the exterior body 10. A welded portion between the current collector member 51 and the inversion plate 41 or the thin portion 52 of the current collector member 51 is broken, so that the inversion plate 41 and the current collector member 51 is disconnected. The inversion plate 41 is placed in a state in which the inversion plate 41 is not electrically connected to the current collector member 51. By this operation of the current interrupt device, the flow of current between the battery element B and the positive electrode external terminal 15 is interrupted.

The inversion plate 41 separated from the current collector member 51 is deformed in a direction away from the current collector member 51. More specifically, the inversion plate 41 inverts its curved direction so as to be convex on the side facing the inner flange portion 34 and concave on the side facing the current collector member 51. The inversion plate 41 before the deformation shown in FIGS. 3 and 4 is convex downward in the figures. The inversion plate 41 after the deformation shown in FIGS. 7 and 8 is convex upward in FIGS. 7 and 8. The inversion plate 41 changes its position upward in the figures by being inverted. The temperature sensitive member 45 is disposed on the side opposite to the direction in which the inversion plate 41 changes its position, i.e. on the lower side, with respect to the inversion plate 41.

The inversion plate 41 shown in FIGS. 7 and 8 has a portion extending in a direction, that is inclined with respect to the direction in which the sealing member 12 of the flat plate shape extends, and that is inclined with respect to the direction in which the hollow cylindrical shaft portion 33 extends, so as to approach the sealing member 12 and to get away from the current collector member 51 as going toward the first connecting portion 42 from the second connecting portion 43.

When the inversion plate 41 is inverted, the first connecting portion 42 of the inversion plate 41 comes in contact with the distal end 94 of the conductive member 91. The inversion plate 41 and the conductive member 91 are electrically connected to each other. Consequently, the negative electrode external terminal 14 and the positive electrode external terminal 15 are electrically connected to each other via the conductive plate 16, the bypass member 90, the conductive member 91, the inversion plate 41, the rivet member 19, and the conductive plate 17.

Broken-line arrows shown in FIG. 8 indicate the flow of current. In the state after the inversion plate 41 is inverted, the current flows from the negative electrode external terminal 14, through the conductive plate 16, the bypass member 90, the conductive member 91, the inversion plate 41, the rivet member 19, and the conductive plate 17, to the positive electrode external terminal 15. The negative electrode external terminal 14 and the positive electrode external terminal 15 are electrically connected to each other via the path bypassing the battery element B. The bypass path that establishes electrical connection between the pair of external terminals is formed in the state where the flow of current to the battery element B is interrupted.

The expanded temperature sensitive member 45 shown in FIG. 6 is disposed between the inverted inversion plate 41 and the current collector member 51. The upper surface 46 of the expanded temperature sensitive member 45 is in surface contact with a surface, facing the current collector member 51, of the inverted inversion plate 41. The lower surface 47 of the expanded temperature sensitive member 45 is in surface contact with a surface, facing the inverted inversion plate 41, of the current collector member 51.

The expanded temperature sensitive member 45 has the thickness that is greater than the minimum distance between the inversion plate 41 and the current collector member 51. Therefore, the expanded temperature sensitive member 45 prevents the inversion plate 41 from being deformed again to the normal state shown in FIGS. 3 and 4 from the inverted state shown in FIGS. 7 and 8. By the expanded temperature sensitive member 45, the inversion plate 41 is held in the state where its position is changed. By the expanded temperature sensitive member 45, the state is maintained in which the inversion plate 41 is separated from the current collector member 51. By the expanded temperature sensitive member 45, the state is maintained in which the inversion plate 41 and the current collector member 51 are electrically insulated from each other. By the expanded temperature sensitive member 45, the state is maintained in which the negative electrode external terminal 14 and the positive electrode external terminal 15 are short-circuited to each other via the bypass member 90 and the conductive member 91.

The configurations, operations, and effects of the secondary battery 100 and the battery pack 1 of the embodiment will be collectively described, which is as follows: While reference numerals are assigned to the configurations of the embodiment, this is only by way of example.

As shown in FIG. 2, the secondary battery 100 in the embodiment includes the battery element B, the exterior body 10 that houses therein the battery element B, and the positive electrode external terminal 15 and the negative electrode external terminal 14 that are provided outside the exterior body 10. As shown in FIG. 3, the secondary battery 100 further includes the inversion plate 41 and the temperature sensitive member 45. As shown in FIGS. 7 and 8, the inversion plate 41 short-circuits the positive electrode external terminal 15 and the negative electrode external terminal 14 to each other by changing its position. The inversion plate 41 has a function as a short circuit forming portion of this embodiment. As shown in FIGS. 3 and 7, the temperature sensitive member 45 is disposed adjacent to the inversion plate 41 on the side opposite to the direction in which the inversion plate 41 changes its position. As shown in FIGS. 6 to 8, the volume of the temperature sensitive member 45 increases due to a rise in temperature.

The temperature sensitive member 45 detects a temperature rise in the exterior body 10 and is expanded when the temperature reaches a threshold value, so that the inversion of the inversion plate 41 is facilitated. When the inverted inversion plate 41 is electrically connected to the conductive member 91, the bypass member 90 electrically connected to the negative electrode external terminal 14 and the positive electrode external terminal 15 are electrically connected to each other. In this way, the bypass path that short-circuits the positive electrode external terminal 15 and the negative electrode external terminal 14 to each other is formed. Even if the temperature is lowered, the expanded state of the temperature sensitive member 45 is maintained and therefore the inversion plate 41 is held in the inverted state, so that it is reliably avoided that the inversion plate 41 is accidentally returned to the normal state due to vibration or the like. Since, after the inversion plate 41 changes its position, the inversion plate 41 can be held in the state where its position is changed, it is possible to reliably maintain the short circuit after the formation of the path that short-circuits the positive electrode external terminal 15 and the negative electrode external terminal 14 to each other.

The temperature sensitive member 45 is disposed adjacent to the current collector member 51, electrically connected to the battery element B, in the exterior body 10. Since the temperature sensitive member 45 is disposed to face the battery element B with the current collector member 51 interposed therebetween, the temperature sensitive member 45 can accurately detect a temperature rise of the battery element B. Even when an internal pressure rise due to an internal temperature rise in the exterior body 10 is insufficient, the temperature sensitive member 45 is expanded to invert the inversion plate 41, so that the positive electrode external terminal 15 and the negative electrode external terminal 14 are short-circuited to each other. By configuring the temperature sensitive member 45 to be expanded near a shut-down temperature of the separator forming the battery element B, it is possible to perform control for short-circuiting the positive electrode external terminal 15 and the negative electrode external terminal 14 to each other based on an internal temperature of the exterior body 10.

On the other hand, even if the internal temperature of the exterior body 10 is not increased to an extent that exceeds the threshold value of the temperature sensitive member 45, when the internal pressure of the exterior body 10 is increased, the inversion plate 41 is separated from the current collector member 51 by this internal pressure rise to interrupt the continuity between the battery element B and the positive electrode external terminal 15. The inversion plate 41 is further deformed to establish electrical connection between the bypass member 90 and the positive electrode external terminal 15, thereby short-circuiting the positive and negative electrode external terminals to each other.

By detecting either of a rise in the internal temperature of the exterior body 10 and a rise in the internal pressure of the exterior body 10, the inversion plate 41 is inverted to short-circuit the positive electrode external terminal 15 and the negative electrode external terminal 14 to each other. The inverted inversion plate 41 is held in the inverted state and prevented from returning to the normal state by the expanded temperature sensitive member 45. Therefore, since it is possible to reliably short-circuit the positive electrode external terminal 15 and the negative electrode external terminal 14 to each other, the reliability of the secondary battery 100 can be improved.

The temperature sensitive member 45 contains aluminum phosphite and calcium carbonate. Aluminum phosphite has a high expansion rate, but has a high expansion start temperature. Therefore, if a temperature sensitive member is made of only aluminum phosphite, it is difficult that the temperature sensitive member operates. On the other hand, calcium carbonate has a low exothermic onset temperature, but has a low expansion rate. Therefore, if a temperature sensitive member is made of only calcium carbonate, it is difficult that the temperature sensitive member operates. If the temperature sensitive member 45 is made of the mixture of aluminum phosphite and calcium carbonate as in this embodiment, calcium carbonate can start an exothermic reaction at a low temperature, while aluminum phosphite can start expansion by a temperature rise due to the heat generation of calcium carbonate. Therefore, it is possible to reliably expand the temperature sensitive member 45.

As shown in FIG. 4, the inversion plate 41 forms part of the conduction path between the battery element B and the positive electrode external terminal 15. As shown in FIGS. 7 and 8, the inversion plate 41 interrupts the continuity between the battery element B and the positive electrode external terminal 15 by changing its position. With this configuration, it is possible to interrupt the flow of current between the battery element B and the positive electrode external terminal 15 when the inversion plate 41 changes its position. Since, after the inversion plate 41 changes its position, the inversion plate 41 can be held in the state where its position is changed, it is possible to reliably maintain the electrical interruption between the battery element B and the positive electrode external terminal 15.

As shown in FIG. 3, the inversion plate 41 has the plate shape that is curved in the thickness direction. As shown in FIGS. 7 and 8, the inversion plate 41 interrupts the continuity between the battery element B and the positive electrode external terminal 15 by inverting its curved direction. Since it is possible to reliably interrupt the flow of current between the battery element B and the positive electrode external terminal 15 by the inversion of the inversion plate 41 and thus to prevent charging to the battery element B of the secondary battery 100 subjected to the occurrence of an abnormality, it is possible to reliably stop a rise in the internal pressure of the exterior body 10.

As shown in FIGS. 7 and 8, the inversion plate 41 changes its position when the internal pressure of the exterior body 10 is increased. With this configuration, even at the time of an internal pressure rise without causing a rise in the internal temperature of the exterior body 10, the inversion plate 41 is inverted to change its position in response to the internal pressure rise, so that the inversion plate 41 is electrically connected to the conductive member 91 to short-circuit the positive electrode external terminal 15 and the negative electrode external terminal 14 to each other. Consequently, it is possible to reliably short-circuit the positive electrode external terminal 15 and the negative electrode external terminal 14 to each other.

As shown in FIGS. 5 and 6, the temperature sensitive member 45 has the ring shape. By disposing the ring-shaped temperature sensitive member 45 so as to surround a contact portion between the first connecting portion 42 of the inversion plate 41 and the thin portion 52 of the current collector member 51, shown in FIG. 3, it is possible to reliably maintain, by the expanded temperature sensitive member 45, the state where the inversion plate 41 changes its position and is separated from the current collector member 51.

The temperature sensitive member 45 contains 5 wt % or more and 50 wt % or less calcium carbonate. By containing 5 wt % or more calcium carbonate, it is possible to obtain a calorific value that is necessary for reaching the expansion start temperature of aluminum phosphite. By setting the content of calcium carbonate to 50 wt % or less and setting the balance to aluminum phosphite and unavoidable impurities, it is possible to form the temperature sensitive member 45 sufficiently containing aluminum phosphite whose expansion rate is high, and thus to sufficiently expand the temperature sensitive member 45.

As shown in FIG. 1, the battery pack 1 in the embodiment is constituted by connecting the plurality of secondary batteries 100 in series. When the internal temperature or the internal pressure of the exterior body 10 of one of the secondary batteries 100 is increased, since the bypass path that short-circuits the positive and negative electrode external terminals of the secondary battery 100, subjected to the occurrence of an abnormality, to each other is formed, the continuity between the two secondary batteries 100 connected in series and adjacent to the secondary battery 100 subjected to the occurrence of the abnormality is maintained. Therefore, it is possible to take out the electric power from the remaining normal secondary batteries 100 other than the secondary battery 100 subjected to the occurrence of the abnormality. Since charging and discharging of the battery pack 1 as a whole can be carried out to maintain power supply from the battery pack 1, a device equipped with the battery pack 1 can be used continuously. Therefore, it is possible to improve the reliability of the entire battery pack 1.

In the description of the embodiment so far, the example has been described in which the inversion plate 41 constituting the current interrupt device functions as the short circuit forming portion. The short circuit forming portion is not limited to the above-described example using the inversion plate 41. For example, a member made of a conductive material may be disposed outside the exterior body 10, wherein the member is disposed away from the positive electrode external terminal 15 and the negative electrode external terminal 14 in a normal state, but is electrically connected to both of the positive electrode external terminal 15 and the negative electrode external terminal 14 by changing its position. In this case, by providing a temperature sensitive member adjacent to the member on the side opposite to a direction in which the member changes its position, and by expanding the temperature sensitive member after the member changes its position, it is also possible to obtain an effect to maintain a short circuit between the positive electrode external terminal 15 and the negative electrode external terminal 14.

Hereinbelow, Examples of the disclosure will be described. First, secondary batteries of Examples 1 to 3 and Comparative Examples 1 to 5 were manufactured.

A current collector core member of a positive electrode plate of the secondary battery of each of the Examples and the Comparative Examples was aluminum (Al) with a thickness of 20 μm. The thickness of the positive electrode plate was set to 170 μm. The mixture width of the positive electrode plate was set to 94 mm. The length of the positive electrode plate was set to 4500 mm.

A current collector core member of a negative electrode plate of the secondary battery of each of the Examples and the Comparative Examples was copper (Cu) with a thickness of 14 μm. The thickness of the negative electrode plate was set to 150 μm. The mixture width of the negative electrode plate was set to 100 mm. The length of the negative electrode plate was set to 4700 mm.

A base member of a separator of the secondary battery of each of the Examples and the Comparative Examples had a three-layer structure in which a PP (polypropylene) layer, a PE (polyethylene) layer, and a PP layer were stacked in this order. The thickness of the base member was set to 25 μm.

An electrolyte solution of the secondary battery of each of the Examples and the Comparative Examples was prepared by dissolving $LiPF_6$ in a concentration of 1.0 mol/l (mol/liter) in a mixed solvent in which EC (ethylene carbonate), DMC (dimethyl carbonate), and EMC (ethyl methyl carbonate) were mixed in a volume ratio of 3:4:3, and then adding 1 wt % CHB (cyclohexylbenzene) and 1 wt % BP (biphenyl) as additives. The amount of the electrolyte solution was set to 125 g.

Figure 9:
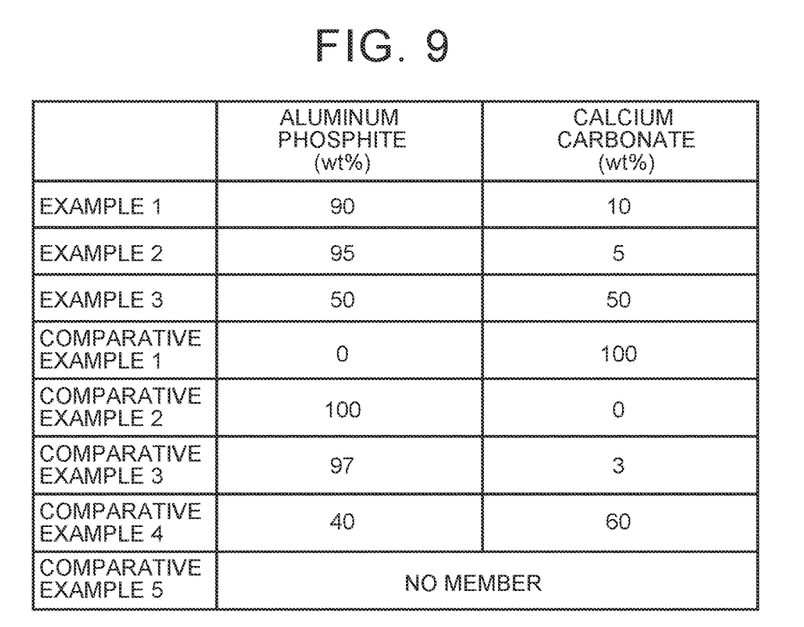
FIG. 9 is a diagram showing mixing ratios of materials of temperature sensitive members of Examples and Comparative Examples.

FIG. 9 is a diagram showing mixing ratios of materials of temperature sensitive members of the Examples and the Comparative Examples. The secondary batteries of Examples 1 to 3 and Comparative Examples 1 to 4 were manufactured respectively using the temperature sensitive members that were formed in the mixing ratios of aluminum phosphite and calcium carbonate shown in FIG. 9. The secondary battery of Comparative Example 5 had a structure with no temperature sensitive member.

The rated capacity of the secondary battery obtained under the above conditions was 24.0 Ah. The manufactured secondary battery was charged to 4.2V at a temperature of 25° C., then, in order to allow an inversion plate to be inverted due to gas generation by CHB and BP, a heating test was performed in which the secondary battery was kept for 3 days at a temperature of 100° C.

A continuity test was performed for the secondary battery having been subjected to the heating test. An ohmmeter was connected to a positive electrode external terminal and a negative electrode external terminal of the secondary battery, thereby confirming a continuity state. If the inversion plate is inverted by the heating test, the positive and negative electrode external terminals are conducted to each other via a short circuit path, while if the inversion plate is not inverted, the positive and negative electrode external terminals are not conducted to each other. In the continuity test, when an internal resistance was measured between the positive electrode external terminal and the negative electrode external terminal, it was determined to be "no continuity".

Subsequently, an accidental return state confirming test by an impact test was performed. Pursuant to a mechanical test for a sealed-type small secondary battery prescribed by JIS (Japanese Industrial Standards) C8713, a drop test was performed according to a method of JIS C60068-2-31. After performing the drop test, a continuity state between the positive and negative electrode external terminals was confirmed. It was determined that if the positive and negative electrode external terminals were conducted to each other, the short circuit path was ensured and thus the inversion plate was not accidentally returned to a normal state, while it was determined that if the positive and negative electrode external terminals were not conducted to each other, the inversion plate was accidentally returned to the normal state.

Figure 10:
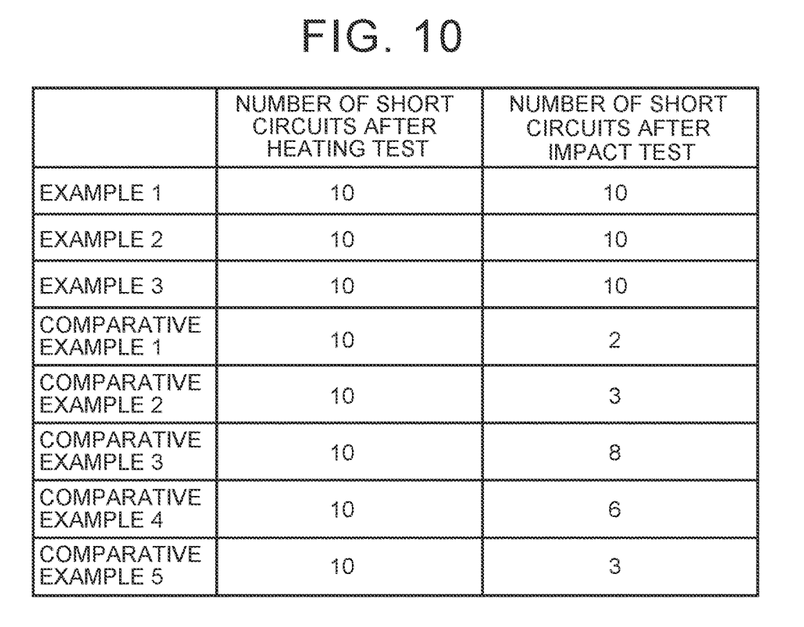
FIG. 10 is a diagram showing the results of continuity tests of secondary batteries using the temperature sensitive members of the Examples and the Comparative Examples.

For each of Examples 1 to 3 and Comparative Examples 1 to 5, the number of tests was set to 10, and the number of samples, that were conducted (short-circuited outside), of 10 samples was confirmed. FIG. 10 is a diagram showing the results of the continuity tests of the secondary batteries using the temperature sensitive members of the Examples and the Comparative Examples. As shown in FIG. 10, directly after the heating test, the inversion plate was inverted and thus the positive and negative electrode external terminals were conducted to each other via the short circuit path in all the samples of the Examples and the Comparative Examples.

In the secondary batteries of Examples 1 to 3, the ring-shaped temperature sensitive member made of a mixture of 5 wt % or more and 50 wt % or less calcium carbonate and aluminum phosphite was disposed adjacent to the inversion plate. Therefore, calcium carbonate produced an exothermic reaction at a relatively low temperature due to gas components that were generated at the time of decomposition of the electrolyte solution, and aluminum phosphite was expanded due to the generated heat, thereby suppressing the return of the inversion plate. As a result, even after the impact test was performed, the inversion plate was not accidentally returned, so that all of the 10 samples maintained a conducting state.

In the secondary battery of Comparative Example 1, since the temperature sensitive member did not contain aluminum phosphite, the expansion rate of the temperature sensitive member was small. As a result, there were the samples in which the inversion plate was accidentally returned by the impact test.

In the secondary battery of Comparative Example 2, since the temperature sensitive member did not contain calcium carbonate, the temperature that was necessary for sufficiently expanding aluminum phosphite was not obtained, so that the temperature sensitive member was not sufficiently expanded. As a result, there were the samples in which the inversion plate was accidentally returned by the impact test.

In the secondary battery of Comparative Example 3, since the content of calcium carbonate was as small as 3 wt %, the calorific value by an exothermic reaction of calcium carbonate was small. Therefore, the temperature that was necessary for sufficiently expanding aluminum phosphite was not obtained, so that the temperature sensitive member was not sufficiently expanded. As a result, there were the samples in which the inversion plate was accidentally returned by the impact test.

In the secondary battery of Comparative Example 4, since the content of calcium carbonate was set to 60 wt %, the content of aluminum phosphite was as small as 40 wt %, so that the temperature sensitive member was not sufficiently expanded. As a result, there were the samples in which the inversion plate was accidentally returned by the impact test.

In the secondary battery of Comparative Example 5, since there was no temperature sensitive member, the operation of holding the inversion plate by the expanded temperature sensitive member was not obtained. As a result, there were the samples in which the inversion plate was accidentally returned by the impact test.

By the Examples described above, it has been proved that when the temperature sensitive member containing 5 wt % or more and 50 wt % or less calcium carbonate and aluminum phosphite is disposed adjacent to the inversion plate, the inverted inversion plate can be held in the inverted state, so that it is possible to reliably prevent the inversion plate from accidentally returning to the normal state.

It should be considered that the embodiment and Examples disclosed this time are only illustrative and are not limitative in any aspect.

What is claimed is:

1. A secondary battery comprising:
   a battery element;
   an exterior body that houses the battery element;
   an external terminal of a first electrode and an external terminal of a second electrode that are provided outside the exterior body;
   a short circuit forming portion that is configured to short-circuit the external terminal of the first electrode and the external terminal of the second electrode to each other by changing a position of the short circuit forming portion; and
   an electrically insulating temperature sensitive member whose volume increases due to a rise in temperature, which is disposed adjacent to the short circuit forming portion on a side opposite to a direction in which the short circuit forming portion changes the position thereof,
   wherein the temperature sensitive member contains aluminum phosphite and calcium carbonate.

2. The secondary battery according to claim 1, wherein the short circuit forming portion is configured to provide part of a conduction path between the battery element and the external terminal of the first electrode and to interrupt continuity between the battery element and the external terminal of the first electrode by changing the position thereof.

3. The secondary battery according to claim 2, wherein the short circuit forming portion has a plate shape that is curved in a thickness direction, the short circuit forming portion configured to interrupt the continuity between the battery element and the external terminal of the first electrode by inverting a curved direction of the short circuit forming portion.

4. The secondary battery according to claim 1, wherein the short circuit forming portion is configured to change the position thereof when an internal pressure of the exterior body is increased.

5. The secondary battery according to claim 1, wherein the temperature sensitive member has a ring shape.

6. The secondary battery according to claim 1, wherein the temperature sensitive member contains 5 wt % or more and 50 wt % or less calcium carbonate.

7. A battery pack in which a plurality of secondary batteries each according to claim 1 are connected in series.

* * * * *